United States Patent [19]

Diaz

[11] Patent Number: 5,550,699

[45] Date of Patent: Aug. 27, 1996

[54] HOT PLUG TOLERANT ESD PROTECTION FOR AN IC

[75] Inventor: Carlos H. Diaz, Palo Alto, Calif.

[73] Assignee: Hewlett-Packard Co., Palo Alto, Calif.

[21] Appl. No.: 290,627

[22] Filed: Aug. 15, 1994

[51] Int. Cl.⁶ .................................................. H02H 9/00
[52] U.S. Cl. .............................. 361/56; 361/91; 361/111; 361/118
[58] Field of Search ................................ 361/56, 58, 91, 361/118, 119, 111

[56] References Cited

U.S. PATENT DOCUMENTS 5,311,391  5/1994  Dungan et al. ............................ 361/56

Primary Examiner—Jeffrey A. Gaffin
Assistant Examiner—Stephen W. Jackson
Attorney, Agent, or Firm—Edward L. Miller

[57] ABSTRACT

A bi-modal trigger circuit for ESD protection in an IC is arranged to use the energy of the ESD event itself to trigger an SCR when VDD is absent and energy from VDD when VDD is present. This is accomplished by top and bottom inverters in series, and a trigger FET whose conduction triggers an SCR, and whose gate is driven by the voltage across the bottom inverter. The trigger threshold of the bi-modal trigger circuit may be raised above VDD when VDD is absent by the inclusion of a constant voltage drop inserted between the series connected top and bottom inverters that comprise the bi-modal trigger. This provides an offset voltage that must be overcome before a trigger FET can turn on and fire an SCR that does the actual ESD protection. The constant voltage drop may be produced by a series string of diode connected FET's. The threshold may also be increased by including a latch-connected feedback FET that shunts the gate of the trigger FET, thereby retarding the turn-on of the trigger FET until saturation in the feedback FET trips the latch. These two techniques can be used separately or in combination. When used in combination the number of diode connected FET's may be reduced to provide a constant voltage drop that is substantially less than the desired increase in the trigger voltage for the bi-modal trigger circuit.

7 Claims, 5 Drawing Sheets

HOT PLUG TOLERANT ESD PROTECTION FOR AN IC

REFERENCE TO RELATED APPLICATIONS

This application is related to the subject matter of U.S. patent application Ser. No. 08/190,756 entitled ESD PROTECTION FOR IC'S filed on 2 Feb. 1994 by Gordon W. Motley and assigned to Hewlett-Packard Co. It is also related to the subject matter of U.S. patent application Ser. No. 07/898,997 entitled ELECTROSTATIC DISCHARGE PROTECTION CIRCUIT FOR INTEGRATED CIRCUITS filed on 15 Jun. 1992 by Larry Metz, Gordon Motley and George Rieck and also assigned to Hewlett-Packard Co. Ser. No. 08/190,757 and Ser. No. 07/898,997 are each hereby incorporated herein by reference.

BACKGROUND OF THE INVENTION

Electrostatic discharge (ESD) and electrical overstress (EOS) protection strategies for MOS technologies are driven by the gate oxide breakdown voltage and the MOS breakdown voltage of the output buffers. The difference between the power supply voltage (VDD) and these breakdown voltages is, during normal operation, only a few volts in the most advanced MOS processes. As a result, the design of ESD protection devices that rely on breakdown has become more complicated, since protection structures are expected to be entirely passive (i.e., not triggered) during normal operation, and yet they should still trigger at a low voltage during ESD event.

Various techniques have been proposed to protect integrated circuits (IC's) from damage caused by ESD. The design goals of higher speed and lower power dissipation promote smaller device geometries operating at reduced supply voltages and having lower breakdown voltages. ESD protection strategies that are viable with earlier generations of IC's are not always suitable for use with the newest generations. For example, isolation resistors that were tolerable in earlier designs may be unacceptable in present day high performance IC's. A preferred protection strategy for these situations is often to rely upon the triggering of active devices, such as low voltage SCR's (LVSCR's). It is desirable for the triggering threshold of the LVSCR's to be as low as possible (which can be just a few volts), unless the IC has power applied, in which case the threshold must exceed the power supply by some margin. This sort of operation for the ESD protection device has been termed "bi-modal triggering". This works, but is not always appropriate for all applications. For example, some interface IC's are coupled to connectors in first equipment that may be driven by bussed signals originating in second equipment and communicated to other equipment also on the bus. If the first equipment is unpowered (although its I/O connector is still "hot" in that it is being driven by other equipment) its ESD protection threshold can be reduced to below the level of the signals being exchanged between the first and third equipment. The resulting triggering of the ESD protection devices, while not likely to cause physical damage, can destroy the integrity of the communication on the bus. It would be desirable if the bi-modal ESD trigger circuit could be equipped with an increased threshold to be used when power is unapplied, but which is still lower than the one used when power is applied.

SUMMARY OF THE INVENTION

A bi-modal trigger circuit for ESD protection in an IC is a circuit that is arranged to use the energy of the ESD event itself to trigger an SCR when VDD is absent and energy from VDD when VDD is present. This is accomplished by top and bottom inverters in series, and a trigger FET whose conduction triggers an SCR, and whose gate is driven by the voltage across the bottom inverter.

The trigger threshold of such a bi-modal trigger circuit for ESD protection of an IC may be raised above VDD when VDD is absent by the inclusion of a constant voltage drop inserted between the series connected top and bottom inverters that comprise the bi-modal trigger. This provides an offset voltage that must be overcome before a trigger FET can turn on and fire an SCR that does the actual ESD protection. The constant voltage drop may be produced by a series string of diode connected FET's. The threshold may also be increased by including a latch-connected feedback FET that shunts the gate of the trigger FET, thereby retarding the turn-on of the trigger FET until saturation in the feedback FET trips the latch. These two techniques can be used separately or in combination. When used in combination the number of diode connected FET's may be reduced to provide a constant voltage drop that is substantially less than the desired increase in the trigger voltage for the bi-modal trigger circuit. The voltage at which the SCR is triggered during an ESD event may be adjusted by varying the number of diodes connected FET's and/or by adjusting the sizes of the various FET's in the circuit.

DESCRIPTION OF A PREFERRED EMBODIMENT

Figure 1:
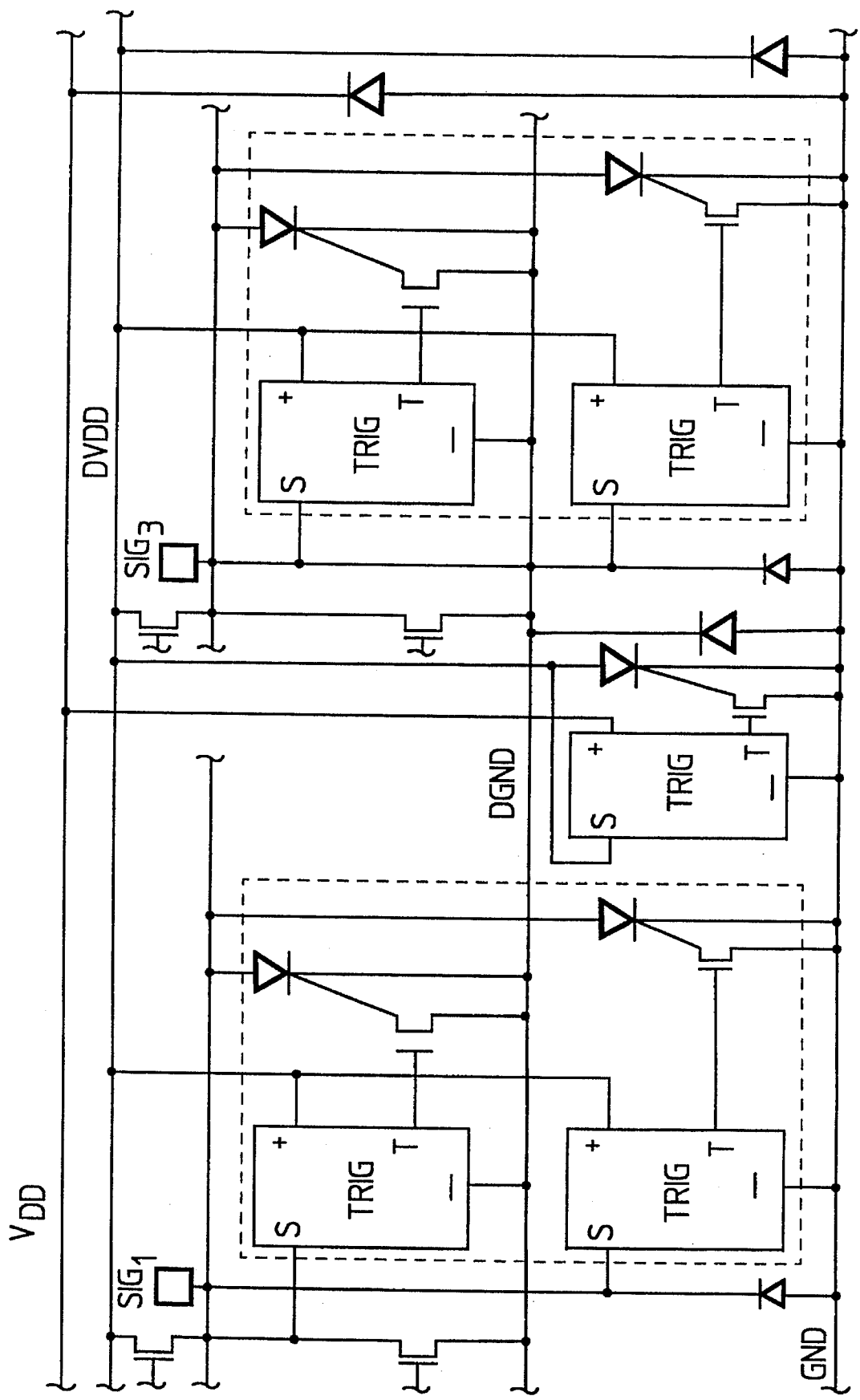
FIG. 1 is a simplified schematic section of an IC showing typical locations of trigger circuits for protective SCR's intended to protect the IC from ESD.
Figure 2:
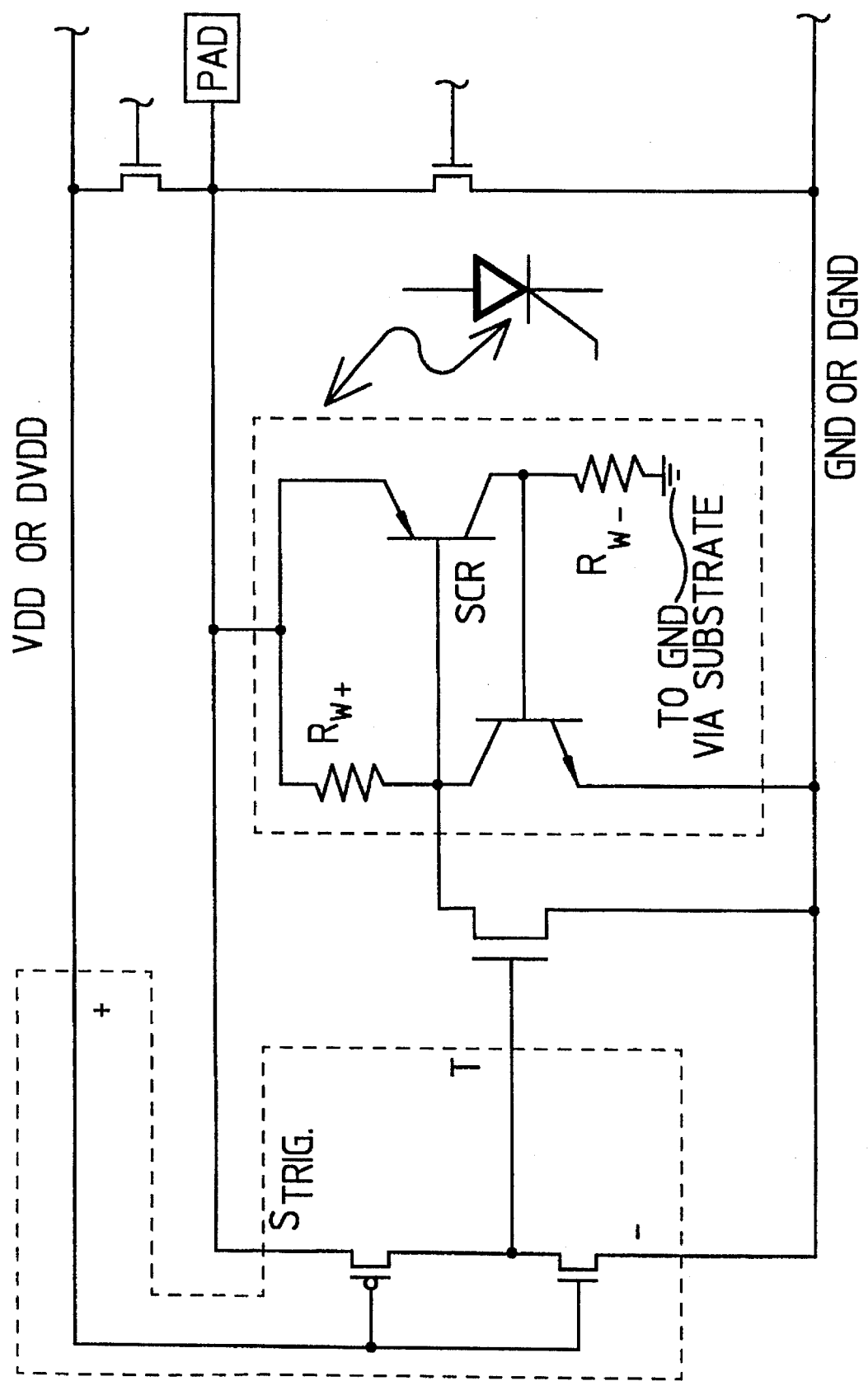
FIG. 2 is a simplified expansion of a TRIG. portion and an SCR portion of the schematic of FIG. 1.

Refer now to FIG. 1, which is a reproduction of a portion of FIG. 6 of the '765 Application. We include it here to show the general (electrical) location of the ESD protection circuitry in which we are interested. Note that there are five circuit elements marked "TRIG.", and that the "T" node of each is coupled to an SCR via a trigger FET. The operation of the circuits shown in the figure are explained in the '756 Application, and that explanation will not be repeated here. Note that the protection from ESD may be established for a variety of paths, including pad to GND, pad to DGND, and DVDD to GND. FIG. 2 is a reproduction of FIG. 7 of the '756 Application, and is included to show in greater detail what may be inside the TRIG. circuits of FIG. 1, as well as to show a useful equivalent of the SCR's therein.

Figure 3:
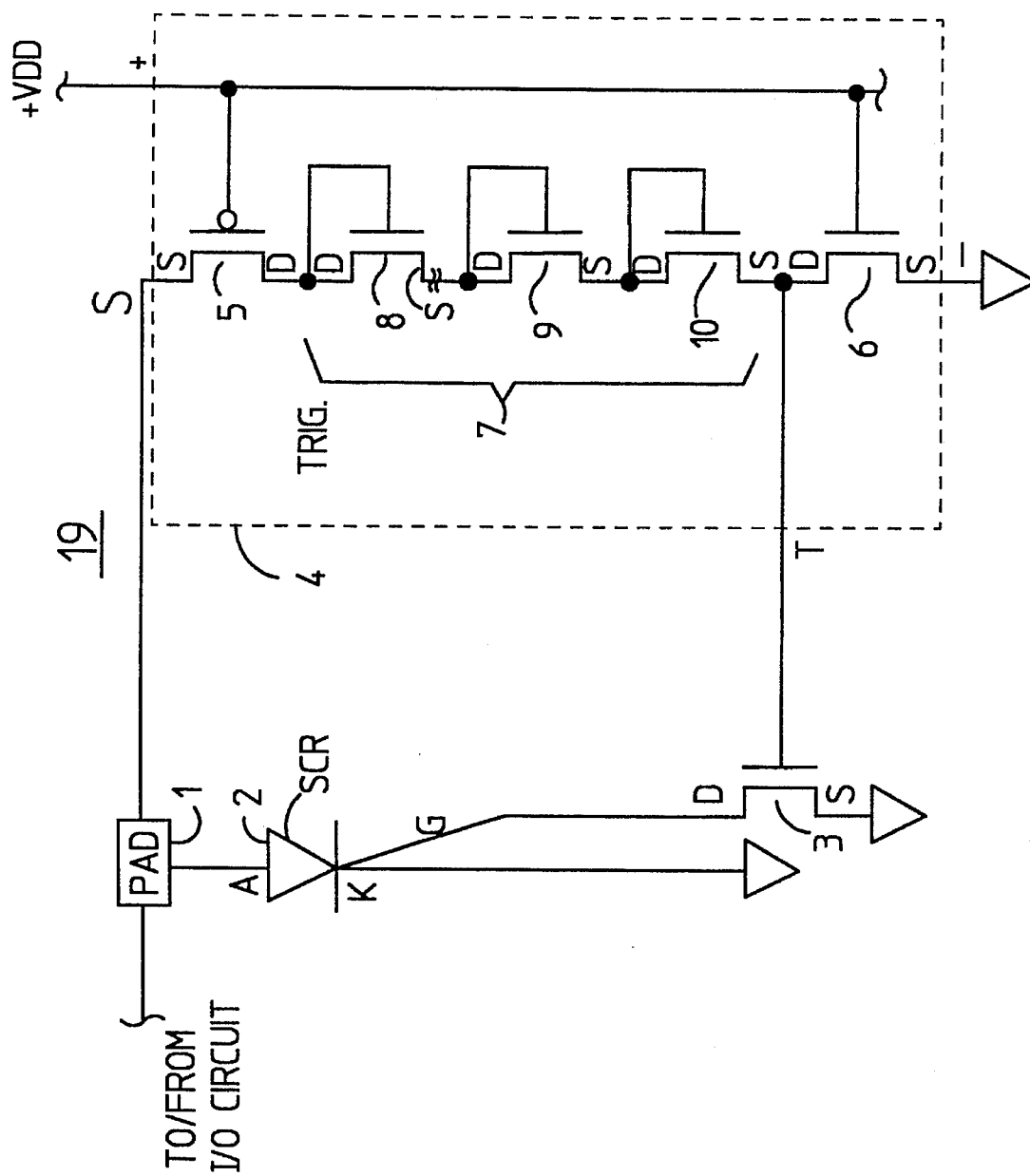
FIG. 3 is a simplified first circuit arrangement usable as the TRIG. portion of FIGS. 1 and 2.

Refer now to FIG. 3, wherein is shown an improved TRIG. circuit 4 for an ESD protection circuit 19. A pad 1 to be protected relative to GND (or DGND) is driven by its associated I/O circuitry (not shown) and is connected to an SCR 2 that is also connected to the return path of interest (e.g., GND or DGND). The gate of the SCR is coupled to a trigger FET 3 whose gate is driven by the T node of the TRIG. circuit 4. Turning on trigger FET 3 turns on SCR 2: the conduction afforded by the SCR constitutes the ESD protection.

Within the TRIG. circuit 4 there is a top inverter FET 5 whose source is coupled to the pad 1 and a bottom inverter FET 6 whose source is connected to the ground reference of interest. A series string 7 of diode connected FET's (8, 9, 10) is coupled between the drain of top inverter FET 5 and the drain of bottom inverter FET 6. The purpose of the series string 7 of diode connected FET's is to create a constant voltage drop that can be used to increase the voltage required between S and—for the TRIG. circuit 4 to turn on trigger FET 3. It will be understood that a string of diode connected FET's is only one way to create a two terminal network exhibiting a constant voltage drop. Another way to accomplish this is with a zener.

The ESD event of interest is when the pad 1 is positive with respect to ground. (For a discussion of the other possibilities, see the '756 Application.) We are principally interested in the case when VDD is off but the pad 1 is being driven, probably by I/O circuitry in another chip because both chips are connected by an intervening bus (not shown). With VDD off top inverter FET 5 is on and bottom inverter FET 6 is off. This allows positive excursions of voltage on the pad 1 to be coupled to the gate of the trigger FET 3. If the series string 7 of diode connected FET's were replaced by a short circuit (the prior art) then any such positive excursions at the pad 1 would be felt almost in their entirety at the gate of trigger FET 3, which is why positive excursions of less than VDD in height could trigger the SCR 2. The voltage drop across the series string 7 of diode connected FET's is subtracted from that applied to node S, thus increasing at node S the level of voltage needed to turn on trigger FET 3.

In an NMOS process where VDD is 3.3 V, it would be desirable if the constant voltage drop across the string 7 could be in the range of two to two and a half volts. Assuming eight tenths of a volt across a diode connected FET, this would suggest three FET's in series for a drop of 2.4 V. This might in fact be achievable in some fabrication processes, but in one particular actual process used it turned out that the drop across each diode connected FET was only two tenths of a volt each. It is believed that sub-threshold leakage currents are the reason for the difference. This suggests using around ten or twelve diode connected FET's in the series string 7 for a VDD of 3.3 V. However, such a large number of diode connected FET's would adversely affect the turn on time of the associated SCR, and is thus counterproductive.

Figure 4:
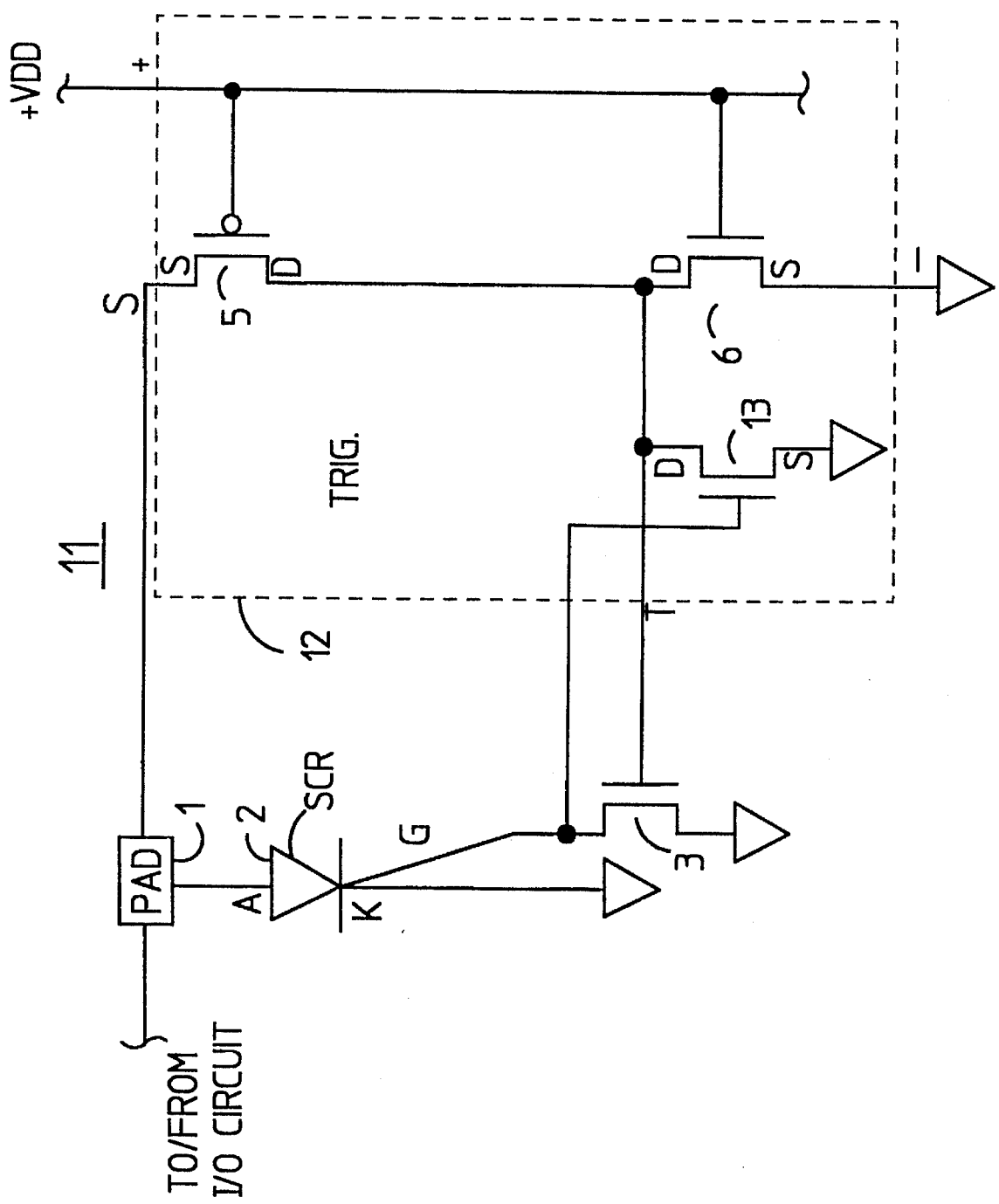
FIG. 4 is a simplified second circuit arrangement usable as the TRIG. portion of FIGS. 1 and 2.

FIG. 4 shows another arrangement 11 in which an increased positive excursion at the pad 1 is required to turn on trigger FET 3. In this arrangement 11 the series string 7 of diode connected FET's (or other two terminal constant voltage network) is absent, and a feedback FET 13 is connected to shunt current around non-conducting bottom inverter FET 6. It is preferred that feedback FET 13 be one tenth to one fifth the size of top inverter FET 5. The operation of the circuit arrangement 11 is a follows: The trigger FET 3 is off when an ESD event begins. The increasing positive voltage at pad 1 is felt across trigger FET 3 via resistive paths within the SCR 2. Thus the gate of feedback FET 13 experiences that positive voltage and tends to turn on. However, feedback FET 13 is small in comparison to top inverter FET 5, and cannot carry a great deal of current. Eventually FET 13 saturates and the voltage across it begins to rise, allowing the trigger FET 3 to turn on. The more trigger FET 3 turns on the less feedback FET 13 conducts current, thus accelerating the turn-on of trigger FET 3 (and hence SCR 2). This action is similar to a latch. That is, the arrangement between FET 3 and FET 13 resembles that in a memory cell. The point at which the latch changes state is determined by the sizes of FET's 3, 5 and 13, in conjunction with the maximum expected value for the signals on the bus. This technique works, although it may be difficult to precisely control during fabrication the value of the saturation current (location of the knee on the curve) for the feedback FET 13, since several parameters have to be controlled to set it and the resulting threshold voltage at any particular value.

Figure 5:
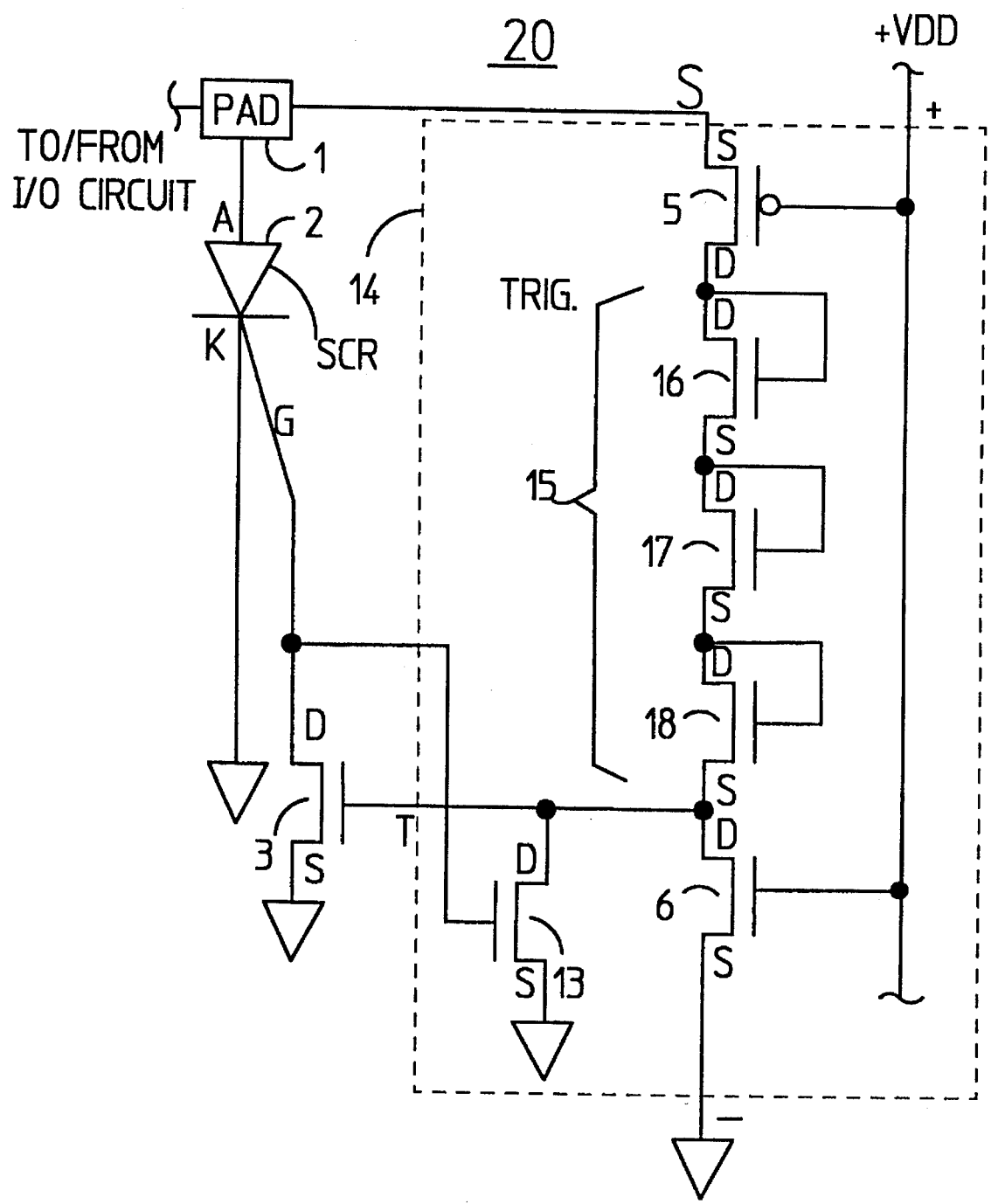
FIG. 5 is a simplified third circuit arrangement combining the techniques shown in FIGS. 3 and 4 and usable as the TRIG. portion of FIGS. 1 and 2.

A hybrid arrangement 20 is depicted in FIG. 5. In this arrangement 20 the pad 1 is connected to a TRIG. circuit 14 that includes both a series string 15 of diode connected FET's 16, 17 and 18 as well as feedback FET 13. This arrangement 20 works quite well, as it tends to remove both the need for a high number of diode connected FET's in the string 15 and the need for an exact determination of the threshold for the feedback FET 13. To appreciate why this is so, consider how the current being shunted by the conducting feedback FET 13 varies as the pad-positive ESD event voltage increases. During the initial portion of the increase there is only subthreshold leakage current passing through the series string 15 of diode connected FET's. While the subthreshold leakage currents may form a staircase current waveform, in no case is that enough current to saturate the feedback FET 13 and trip the latch comprised of trigger FET 3 and the feedback FET 13. However, once all the diode connected FET's are on the shunt current through feedback FET 13 rises abruptly to some minimum (floor) value, and then continues to increase as a function of the ESD event voltage. The idea is to put the knee of the feedback FET 13 close to the floor value of the shunt current. It can actually be on either side, and the circuit arrangement 20 will perform satisfactorily.

If, for example, VDD is 3.3 V and the voltage drop across series string 15 is close to 2.4 V (either there are many FET's in the series string 15, or by adjusting process variables the drop across each diode connected FET is made to approach eight tenths of a volt, or both) then it can be arranged that the floor value of the shunt current through feedback FET 13 is at least as high as the saturation level. That means the latch of FET's 13 and 3 will switch immediately after all diode connected FET's are on. On the other hand, if the combined voltage drop across the diode connected FET's is low, say, six tenths of a volt, then an additional increase in the shunt current is needed beyond the floor value. But even so, a more relaxed control of the threshold of the feedback-trigger FET latch (13, 3) is possible, since there is the guarantee of whatever margin is provided by the voltage drop across the string 15 of the diode connected FET's.

The operation of the circuit arrangements 19, 11 and 20 in FIGS. 3, 4 and 5, respectively, is somewhat different when VDD is on, although aspects of the above explanation still apply. The main difference is that the top inverter FET 5 will be off, and that the bottom inverter FET 6 will be on. A pad-positive ESD event will eventually raise the S node of the TRIG. circuit above the gate of the top inverter FET 5, turning it on. Then it will eventually raise it by the additional amount of the voltage drop across the series string of diode connected FET's. At this point there is a drive fight between the current available from the top inverter FET 5 and the series string of diode connected FET's, and how much can be sunk by the turned on bottom inverter FET 6. By design that bottom inverter FET 6 is not very big, so it loses the fight, saturates, and the resulting rise in voltage turns on the trigger FET 3. During the drive fight the voltage on node T will rise according to the ratio of the on resistances of FET's 5 and 6. The rising voltage is coupled directly to the gate of trigger FET 13, which, by design is large, so that not much gate voltage is required to turn FET 13 on and so trigger the SCR 2.

It may be noted that in the case when VDD is on the added threshold voltage provided by the series string of diode connected FET's, or by the feedback FET, or by their use in combination, is an unneeded increase above VDD. While this is a "change in the wrong direction", it turns out to be a reasonable price to pay for hot plug tolerance with VDD off, since the case of VDD on implies that the IC is mounted in a larger circuit, and is therefore very much less vulnerable to ESD damage, anyway.

It will be further appreciated that by varying the number of diode connected FET's in the series string and/or by adjusting the sizes of FET's 3, 5 and 13, the trigger point for firing the SCR 2 can be adjusted to a value that will provide both adequate ESD protection and hot plug tolerance.

It will of course be understood that, while the invention has been disclosed and described in the context of an NMOS process, and with a relatively small VDD of 3.3 V, the invention may also be practiced with PMOS processes and with substantially different values for VDD.

We claim:

1. An ESD protection circuit for an integrated circuit having a plurality of electrical terminals, the ESD protection circuit comprising:

a reference that serves as a power supply return for electrical currents flowing within the integrated circuit;

a signal node susceptible to ESD via a conductive path coupling the signal node to one of the terminals in the plurality thereof;

an SCR coupled between the signal node and the reference, and also having a gate;

a trigger FET having a drain coupled to the gate of the SCR, a source coupled to the reference, and also having a gate;

a first inverter FET having a source coupled to the signal node, a drain, and also having a gate coupled to a power supply;

a second inverter FET having a source coupled to the reference, a drain, and also having gate coupled to the power supply;

a two terminal network exhibiting a constant voltage drop and coupled between the drain of the first inverter FET and the drain of the second inverter FET; and the gate of the trigger FET being coupled to the drain of the second inverter FET.

2. An ESD protection circuit as in claim 1 wherein the two terminal network comprises a series string of at least one diode connected FET.

3. An ESD protection circuit as in claim 1 wherein the two terminal network comprises a zener.

4. An ESD protection circuit for an integrated circuit having a plurality of electrical terminals, the ESD protection circuit comprising:

a reference that serves as a power supply return for electrical currents flowing within the integrated circuit;

a signal node susceptible to ESD via a conductive path coupling the signal node to one of the terminals in the plurality thereof;

an SCR coupled between the signal node and the reference, and also having a gate;

a trigger FET having a drain coupled to the gate of the SCR, a source coupled to the reference, and also having a gate, the trigger FET having a threshold gate voltage, which when present, causes the trigger FET to trigger the SCR;

a first inverter FET having a source coupled to the signal node, a drain, and also having a gate coupled to a power supply;

a second inverter FET having a source coupled to the reference, a drain coupled to the drain of the second inverter FET, and also having gate coupled to the power supply;

a feedback FET having a drain coupled to the drain of the second inverter FET, a source coupled to the reference and a gate coupled to the drain of the trigger FET, the feedback FET being normally off in the absence of an ESD event, and turning on by a selected amount at the onset of an ESD event, so as to retard the occurrence of the threshold gate voltage of the trigger FET; and the gate of the trigger FET being coupled to the drain of the second inverter FET.

5. An ESD protection circuit for an integrated circuit having a plurality of electrical terminals, the ESD protection circuit comprising:

a reference that serves as a power supply return for electrical currents flowing within the integrated circuit;

a signal node susceptible to ESD via a conductive path coupling the signal node to one of the terminals in the plurality thereof;

an SCR coupled between the signal node and the reference, and also having a gate;

a trigger FET having a drain coupled to the gate of the SCR, a source coupled to the reference, and also having a gate, the trigger FET having a threshold gate voltage, which when present, causes the trigger FET to trigger the SCR;

a first inverter FET having a source coupled to the signal node, a drain, and also having a gate coupled to a power supply;

a second inverter FET having a source coupled to the reference, a drain, and also having gate coupled to the power supply;

a two terminal network exhibiting a constant voltage drop and coupled between the drain of the first inverter FET and the drain of the second inverter FET;

a feedback FET having a drain coupled to the drain of the second inverter FET, a source coupled to the reference and a gate coupled to the drain of the trigger FET, the feedback FET being normally off in the absence of an ESD event, and turning on by a selected amount at the onset of an ESD event, so as to retard the occurrence of the threshold gate voltage of the trigger FET; and the gate of the trigger FET being coupled to the drain of the second inverter FET.

6. An ESD protection circuit as in claim 5 wherein the two terminal network comprises a series string of at least one diode connected FET.

7. An ESD protection circuit as in claim 5 wherein the two terminal network comprises a zener.

* * * * *